US005739455A

United States Patent [19]

Poon

[11] Patent Number: 5,739,455

[45] Date of Patent: Apr. 14, 1998

[54] ELECTRONIC GUITAR MUSIC SIMULATION SYSTEM

[76] Inventor: Yiu Cheung Poon, 5/F, Agincourt Ind. Bldg., 428 Cha Kwo Ling Rd.,, Yau Tong, Kowloon, Hong Kong

[21] Appl. No.: 768,381

[22] Filed: Dec. 17, 1996

[51] Int. Cl.[6] .............................. G09B 15/04; G10H 1/18

[52] U.S. Cl. .............................. 84/615; 84/646; 84/722; 84/DIG. 30; 84/478

[58] Field of Search .............................. 84/609–614, 645, 84/646, 722, DIG. 30, 477 R, 478, 615–620, 653–658

[56] References Cited

U.S. PATENT DOCUMENTS 4,177,705 12/1979 Evangelista .
4,336,734 6/1982 Polson .
4,339,979 7/1982 Norman .
4,580,479 4/1986 Bonanno .
4,702,141 10/1987 Bonanno .
4,794,838 1/1989 Corrigan, III .......................... 84/478 X
4,951,545 8/1990 Yoshida .
5,007,324 4/1991 DeMichele .......................... 84/477 R X
5,010,800 4/1991 Yoshida .
5,121,668 6/1992 Segan et al. .
5,576,507 11/1996 LaMarra .......................... 84/645

*Primary Examiner*—Stanley J. Witkowski
*Attorney, Agent, or Firm*—Andrew J. Dillon

[57] ABSTRACT

An electronic guitar music simulation system which includes a guitar shaped keyboard having multiple key switches corresponding to various musical notes. A control processor within the guitar shaped keyboard is utilized to detect each change in a key switch state and infrared transmitter then transmits a unique code corresponding to the change in state for each key switch. A battery powered infrared receiver unit receives each unique code and couples binary codes to the processor of a personal computer system, via an electrical connection to a parallel port of the computer system. A software module within the computer system then converts the binary code into a corresponding audio output signal which may be output via the computer system speaker. A power control circuit within the infrared receiver unit activates the infrared receiver unit only in response to a selected control signal from the computer system, preventing false activation of the infrared receiver unit.

10 Claims, 4 Drawing Sheets

ELECTRONIC GUITAR MUSIC SIMULATION SYSTEM

BACKGROUND OF THE INVENTION

1. Technical Field

The present invention relates in general to electronic musical instruments and in particular to an electronic guitar music simulation system. Still more particularly, the present invention relates to an electronic guitar music simulation system which utilizes a wireless link to a personal computer system.

2. Description of the Related Art

Electronic guitars and electronic toy guitars are known in the prior art. One prior art electronic guitar was distributed by Suzuki Corporation USA under the name Unisynth. The Unisynth product included a short string section comprising six strings as on a real guitar and a neck having twelve frets, although there were no strings on the neck. Rather, the neck comprised a plurality of touch sensitive actuators. The strings are not acoustic strings but rather are actuators, i.e. striking a string generates an electrical pulse proportional to the force with which the string is struck, thereby signalling circuitry inside the body to play the appropriate note. The Unisynth product included several modes such as a manual mode, an auto-chord mode and a demo mode.

The Unisynth product is described in U.S. Pat. No. 5,121,668 which discloses an electronic guitar having a variety of modes and sounds which is of sufficient complexity to maintain the interest of both adolescents and adults, but which is nevertheless relatively simple to operate and master.

U.S. Pat. No. 5,121,668 discloses a microprocessor-based electronic guitar which generates a music signal for driving an integrated speaker. The electronic guitar includes a housing defining a neck and a body, a plurality of manually actuatable strings secured to the body and a plurality of push buttons distributed along the neck.

U.S. Pat. No. 4,177,705 discloses a stringless electronic musical instrument shaped like a guitar which sounds like a guitar which includes a plurality of flexible actuator blade type members which are mounted on edge and adapted to be strummed or picked. Flexing each of the actuator blades in either direction closes one or more leafs which control the amplified output of an electronic oscillator whose fundamental operating frequency is further varied in accordance with finger actuation of a plurality of fret-board switches.

Similar electronic guitar simulations can be seen in U.S. Pat. No. 4,339,979, U.S. Pat. No. 4,336,734, and U.S. Pat. No. 5,010,800, each of which disclose an electronic guitar equivalent which utilizes switches in place of selected strings.

While each of the aforementioned electronic guitars provides a technological equivalent of a stringed instrument, the complexity of circuitry required within each of these instruments renders those instruments complex to manufacture and expensive to implement.

It should therefore be apparent that a need exists for an electronic guitar music simulation system which includes only moderate complexity but which can be utilized in conjunction with a general purpose personal computer.

SUMMARY OF THE INVENTION

It is therefore one object of the present invention to provide an improved electronic musical instrument.

It is another object of the present invention to provide an improved electronic guitar music simulation system.

It is yet another object of the present invention to provide an improved electronic guitar music simulation system which can be utilized with a wireless link and a personal computer system.

The foregoing objects are achieved as is now described. An electronic guitar music simulation system is provided which includes a guitar shaped keyboard having multiple key switches corresponding to various musical notes. A control processor within the guitar shaped keyboard is utilized to detect each change in a key switch state and infrared transmitter then transmits a unique code corresponding to the change in state for each key switch. A battery powered infrared receiver unit receives each unique code and couples binary codes to the processor of a personal computer system, via an electrical connection to a parallel port of the computer system. A software module within the computer system then converts the binary code into a corresponding audio output signal which may be output via the computer system speaker. A power control circuit within the infrared receiver unit activates the infrared receiver unit only in response to a selected control signal from the computer system, preventing false activation of the infrared receiver unit.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
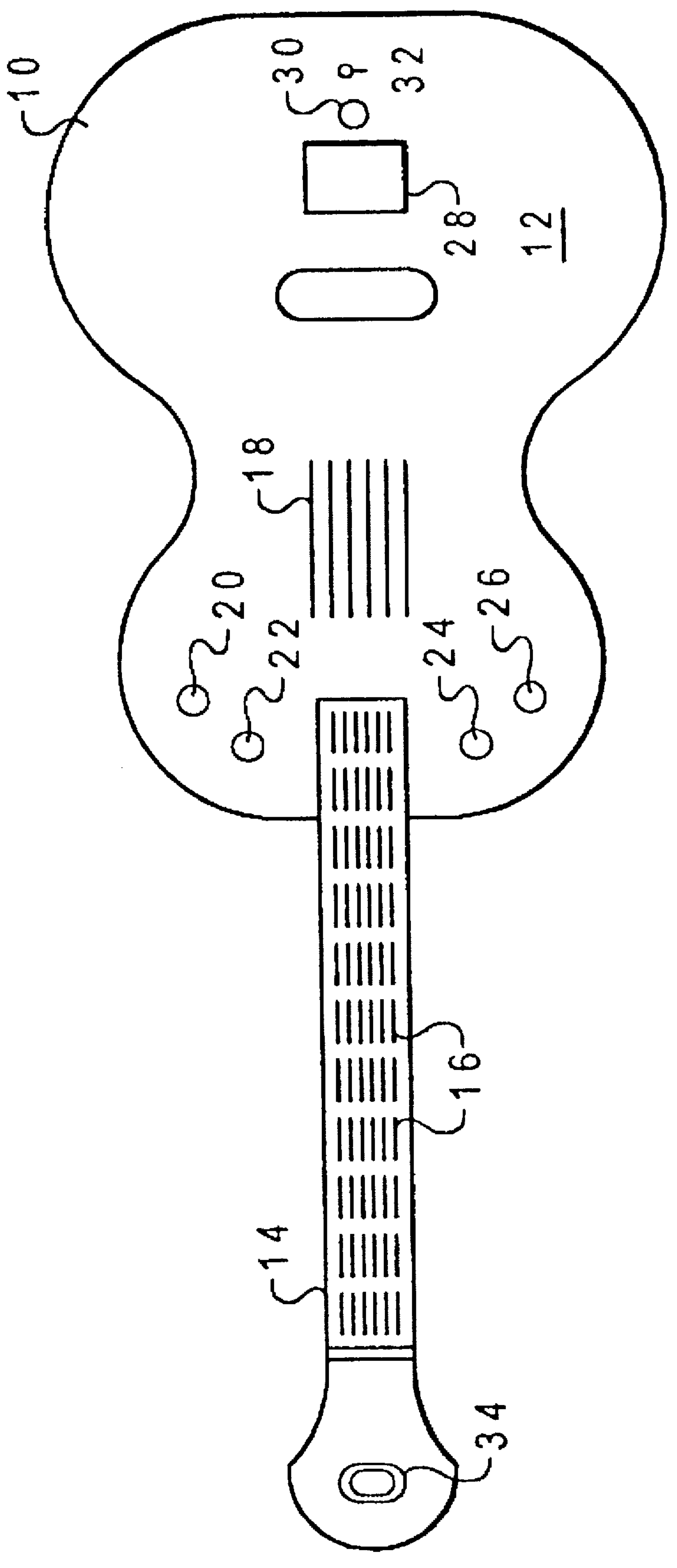
FIG. 1 is a pictorial representation of a guitar keyboard provided in accordance with the present invention.

With reference to the figures and in particular with reference to FIG. 1, there is depicted a guitar keyboard member 10 which comprises a guitar body 12 and a guitar neck 14. Mounted within guitar keyboard member 10 along guitar neck 14 are a plurality of notes which is 16. Additionally, a strum mode switch 18 is also provided which may be actuated to enable the sequential and substantially simultaneous activation of multiple note switches.

Also depicted within guitar body 12 are a plurality of control switches. Menu select switch 20 is provided which may be utilized to select one of a plurality of modes of operation for guitar keyboard member 10. Each mode of operation may be displayed within menu display 28, which may be provided utilizing a liquid crystal display, a fixed menu with light emitting diode indicators or other suitable display techniques.

Enter switch 22 is also provided within guitar body 12 and serves to select the currently displayed menu option.

Similarly, left select switch 24 and right select switch 26 permit the user to vary the display and selection of multiple menu items within a menu of modes of operation.

Also depicted within guitar body 12 is record switch 30. Record switch 30 is utilized, in a manner which will be explained in greater detail herein, to cause the recordation of the actuation of multiple key switches over a period of time so that musical compositions may be recorded and played back upon demand. A record indicator light 32 is also provided, indicating that the record mode has been entered. Record indicator light 32 may comprise a light emitting diode or other similar indicator.

Next, in accordance with an important feature of the present invention, an infrared transmit diode 34 is depicted, mounted at the end of guitar neck 14. Of course, those skilled in the art will appreciate that infrared transmit diode 34 may be mounted at any location within guitar keyboard member 10, so long as infrared transmit diode 34 is typically unobstructed by the operation of the user during the playing of guitar keyboard member 10. Infrared transmit diode 34 is utilized, in a manner which will be explained in greater detail herein, to transmit a series of data corresponding to each actuation of one of the operating key switches to a personal computer, which may be utilized, in conjunction with appropriate software, to simulate guitar music.

Figure 2:
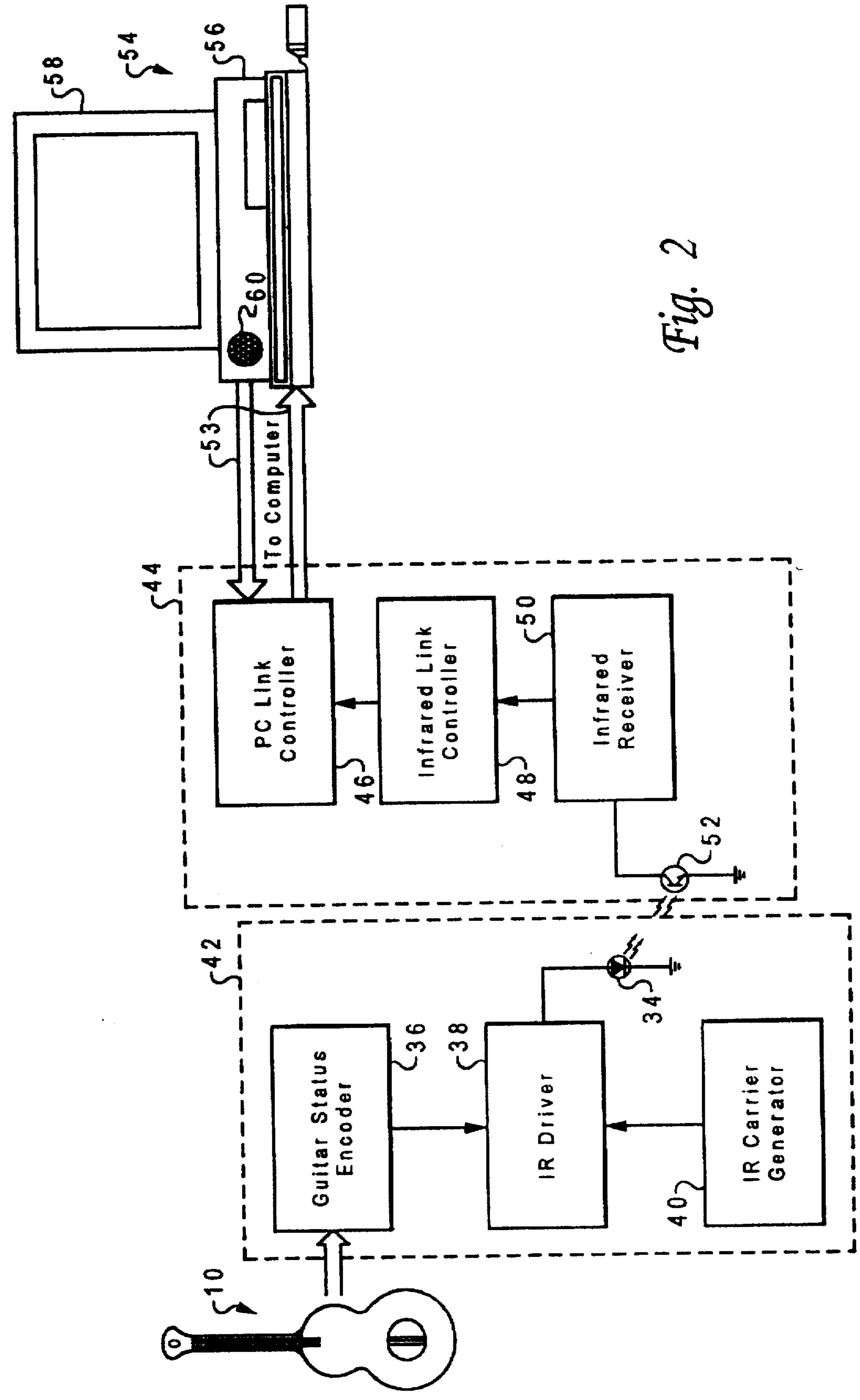
FIG. 2 is a partially pictorial high-level functional block diagram of the guitar simulation system of the present invention.

Referring now to FIG. 2, there is depicted a partially pictorial high-level functional block diagram of the guitar music simulation system of the present invention. As illustrated, guitar keyboard member 10 includes a transmit module 42 mounted therein. Transmit module 42 includes a guitar status encoder 36 which, as those having ordinary skill in the art will appreciate, may scan each of the key switches within guitar keyboard member 10 and detect the actuation or release of any key switch provided therein. In an effort to minimize the amount of data which must be transmitted, only a change in the status of a key switch will be transmitted to the personal computer system utilized to simulate guitar music. That is, when any key switch within guitar keyboard member 10 is depressed or released the change in status of that key switch is detected and encoded by guitar status encoder 36. Each code word so generated is then transmitted to infrared driver 38. Infrared driver 38, in conjunction with infrared carrier generator 40 is then utilized, in a manner well known in the infrared transmission art, to transmit a series of data via infrared transmit diode 34.

Next, it may be seen that the high-level functional block diagram of FIG. 2 includes a receiver module 44. Receiver module 44 is utilized to detect data corresponding to a change state in a key switch within guitar keyboard member 10 via infrared receiver unit 52. Infrared receiver unit 52 is coupled to infrared receiver 50. The output of infrared receiver 50 is coupled to infrared link controller 48 which, in combination with personal computer link controller 46 provides a communication link to personal computer 54. As depicted, personal computer link controller 46 is coupled to personal computer 54 via a bi-directional parallel port connection 53.

As those skilled in the art will appreciate, personal computer 54 includes a processor unit 56 and a monitor 58. Also provided within personal computer 54 is an audio speaker 60. In a manner which will be explained in greater detail herein, the data transmitted from guitar keyboard member 10 is converted into binary code which may be utilized within personal computer 54 to generate a series of audio tones which may be output via audio speaker 60. Of course, those skilled in the art will appreciate that a modern computer system often includes a so-called "sound board" which is capable of outputting high quality sound in a stereo environment. The system of the present invention will find equal application in that environment and audio speaker 60 may comprise multiple speakers in that particular environment.

Figure 3:
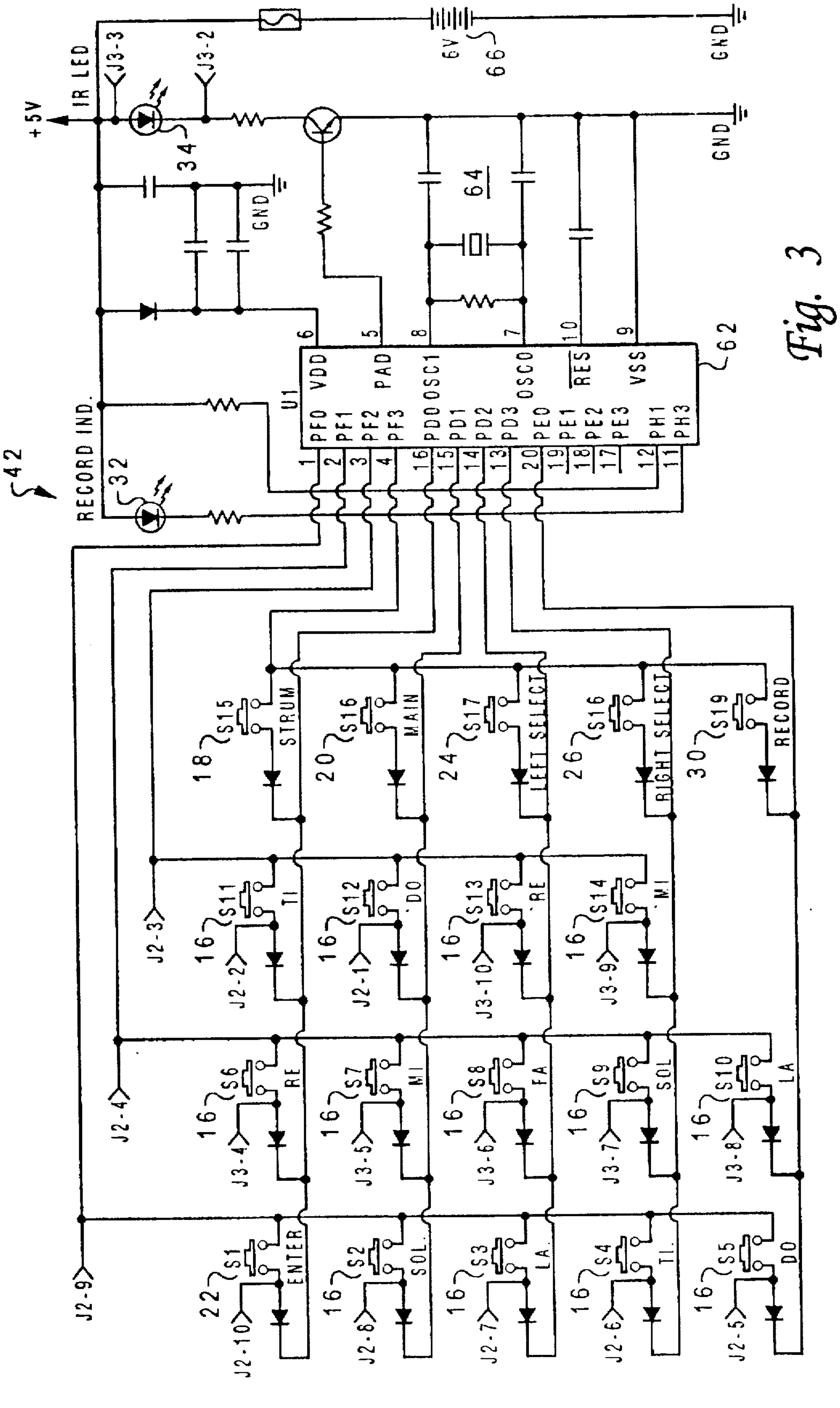
FIG. 3 is a schematic diagram of the transmitter module of the present invention.

With reference now to FIG. 3, there is depicted a schematic diagram of transmitter module 42 of the present invention. As illustrated, transmitter module 42 includes a plurality of key switches, as described with respect to FIG. 1. Thus, note switches 16, strum switches 18, menu select switch 20, enter switch 22, left select switch 24 and right select switch 26, are all depicted. Of course, the present invention may be implemented utilizing a greater or smaller number of key switches in accordance with the desired complexity of the final product.

Each of the key switches depicted, in accordance with modern keyboard scanning techniques, is coupled to microcontroller 62. Microcontroller 62 comprises, in the depicted embodiment of the present invention, a four bit microcontroller which includes a timing circuit 64, comprising a resistor, crystal, and multiple capacitors in order to generate a clock signal for operation.

Record mode indicator 32 and infrared transmit diode 34 are also depicted within FIG. 3. The transmitter module 42 is powered by a battery 66; however, those having ordinary skill in the art will appreciate that other forms of electrical power provision may be utilized.

Thus, as depicted within FIG. 3, control key switch activations and note key switch operations can be encoded utilizing the circuitry of microcontroller 62 and then transmitted by modulating the output of infrared transmit diode 34 for reception by the receiver module.

The following is a table of the various states and actions which are accomplished utilizing microcontroller 62 within transmitter module 42.

TABLE 1

| state | Action |
|---|---|
| 1 | Clear OLD_KEYS to represent the "All buttons are not released" condition |
| 2 | Scan all buttons and put button status into NEW_KEYS |
| 3 | If the REC. button changed from released state to depressed state then inverse the record indicator light (34) |
| 4 | If NEW_KEYS equals OLD_KEYS then go to state 2 |
| 5 | Store NEW_KEYS into OLD_KEYS |
| 6 | Combine the record status indicator and the button status into a code word |
| 7 | Transmit a preamble signal (turning on the infrared carrier for 15 ms then off for 4.4 ms) |
| 8 | Transmit the code word using pulse position modulation on the infrared carrier |
| 9 | Turn off the infrared carrier |
| 10 | Go to state 2 |

Figure 4:
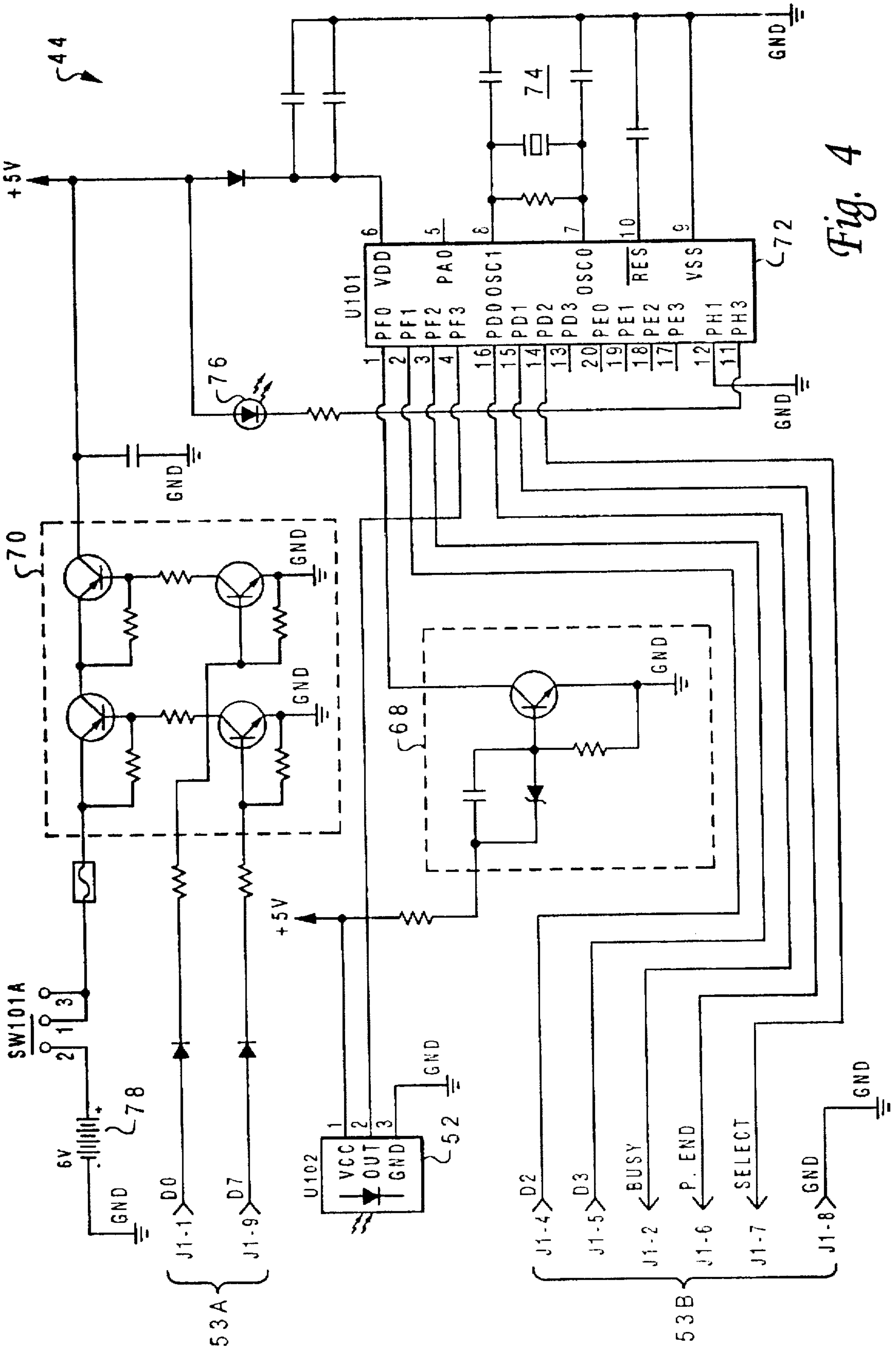
FIG. 4 is a schematic diagram of the receiver module of the present invention.

Finally, referring to FIG. 4, there is depicted a schematic diagram of receiver module 44 of the present invention. As illustrated, parallel prot connection 53 is depicted as including connections 53A and 53B. Infrared receiver unit 52 is depicted and is utilized, in a manner well known to those having skill in electronic art, to receive modulated infrared signals from infrared transmit diode 34. Thus, during transmission of modulated pulses by infrared transmit diode 34, if infrared receiver unit 52 is within light of sight of infrared transmit diode 34, highly complex modulated signals may be passed in a wireless manner. A low power detection circuit 68 is provided and is utilized to provide an indication of low power, indicating the necessity of replacing battery 78. Of course, as described above, alternate provision of electrical power may be implemented without departing from the spirit and intent of the present application.

Additionally, as indicated at reference numeral 70, four transistors are provided in a power control circuit. Thus, in the presence of an appropriate control signal at parallel port connection 53A, from personal computer 54, the transistors within power control circuit 70 which are in series with battery 78 will conduct, providing electrical power to receiver module 44. This power control circuit is provided in order to prevent faults activation of receiver module 44 and thus, as described herein, an appropriate control signal from personal computer 54, generated by an appropriate software module, must be present in order to activate receiver module 44.

Microcontroller 72 is depicted. Microcontroller 72 is preferably a four bit micro processor which is utilized to decode the data transmitted by transmitter module 42 and convert that data into appropriate binary signals which are coupled to personal computer 54 utilizing selected pins within parallel port connection 53B. A light emitting diode 76 is provided for providing a visual indication of the receipt of data from transmitter module 42. Also, timing circuit 74 is provided in a manner similar to that described within FIG. 3, such that a timing clock signal may be generated for use by microcontroller 72.

The following table depicts the various states and actions utilized to control the operation of receiver module 44 by a microcontroller 72.

TABLE 2

| State | Action |
|---|---|
| 1 | If PC side issued a DATA_REQUEST signal then go to state 12 |
| 2 | If infrared sensor detected an infrared signal then go to state 4 |
| 3 | Go to state 1 |
| 4 | Turn on light emitting diode (76) |
| 5 | If infrared preamble received is in error then go to state 10 |
| 6 | Decode the infrared signal to get the code word |
| 7 | If decode error then go to state 10 |
| 8 | Store the code word into the PC link buffer |
| 9 | Issue DATA_READY signal to the PC side |
| 10 | Turn off infrared detected indicator |
| 11 | Go to state 1 |
| 12 | If the PC link buffer is full then go to state 15 |
| 13 | Clear DATA_READY signal |
| 14 | Go to state 1 |
| 15 | Issue ACKNOWLEDGE signal to the PC side |
| 16 | Wait for PC_READ signal from the PC side |
| 17 | Clear the ACKNOWLEDGE signal |
| 18 | Transmit the data in the PC link buffer to the PC side |
| 19 | Clear the DATA_READY signal |
| 20 | If there was no transmission error then go to state 1 |
| 21 | Issue DATA_READY signal to the PC side |
| 22 | Go to state 1 |

Thus, as described herein, those skilled in the art will appreciate that guitar keyboard member 10 may be utilized, in conjunction with actuation of the various key switches provided therein, to generate a series of data pulses which are representative of desired guitar music output. The actuation and release of the various key switches is then encoded, utilizing the microcontroller 62 to modulate the output of infrared transmit diode 34 so that these pulses may be detected at a receiver module 44 which is coupled to and utilized in conjunction with a personal computer. A software module within the personal computer is then utilized to generate synthetic guitar music in response to actuation of the various key switches within guitar keyboard member 10 in a manner which is highly efficient and which negates the requirement for substantial complexity within guitar keyboard member 10.

While the invention has been particularly shown and described with reference to a preferred embodiment, it will be understood by those skilled in the art that various changes in form and detail may be made therein without departing from the spirit and scope of the invention.

I claim:

1. An electronic guitar music simulation system comprising:

a guitar shaped member;

a plurality of switch devices mounted to said guitar shaped member;

a control processor coupled to said plurality of switch devices for detection of actuation of each of said plurality of switch devices;

wireless transmitter coupled to said control processor for transmitting a series of data corresponding to each actuation of one of said plurality of switch devices;

a personal computer system which includes a video output device, an audio output device, a processor unit and at least one port for accessing said processor unit;

a receiver coupled to said personal computer system via said at least one port for receiving said series of data and for converting said series of data into binary code suitable for processing by said processor unit within said personal computer system; and computer program module executable by said processor unit within said personal computer system for converting said binary code into audio output signals coupled to said audio output device such that guitar music simulation occurs in response to selected actuations of selected ones of said plurality of switch devices.

2. The electronic guitar music simulation system according to claim 1 wherein said control processor is mounted within said guitar shaped member.

3. The electronic guitar music simulation system according to claim 2 wherein said wireless transmitter is mounted within said guitar shaped member.

4. The electronic guitar music simulation system according to claim 1 wherein said wireless transmitter is battery powered.

5. The electronic guitar music simulation system according to claim 1 wherein said receiver is battery powered.

6. The electronic guitar music simulation system according to claim 1 wherein said at least one port comprises a parallel port.

7. The electronic guitar music simulation system according to claim 1 wherein said wireless transmitter transmits a series of infrared corresponding to each actuation of one of said plurality of switch devices.

8. The electronic guitar music simulation system according to claim 1 further including memory within said control processor for recording a series of actuations of said plurality of switch devices for subsequent retrieval.

9. The electronic guitar music simulation system according to claim 8 further including an indicator for providing a visual indication that recording of a series of actuations of said plurality of switch devices is occurring.

10. The electronic guitar music simulation system according to claim 1 further including power activation circuitry within said receiver for activating said receiver only in response to a selected control signal from said personal computer.

* * * * *